(Model.)
F. STITZEL.
ROTARY WATER METER.
No. 297,092.    Patented Apr. 15, 1884.
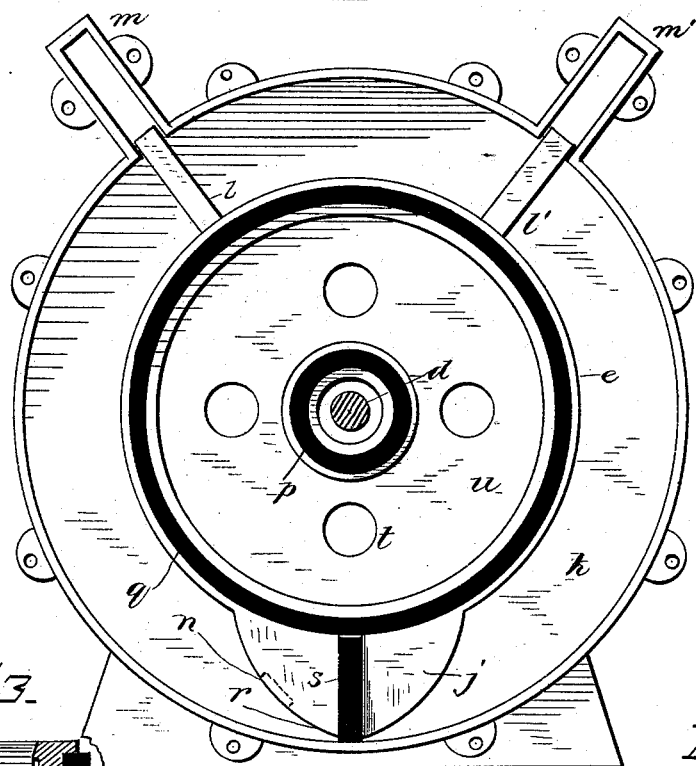
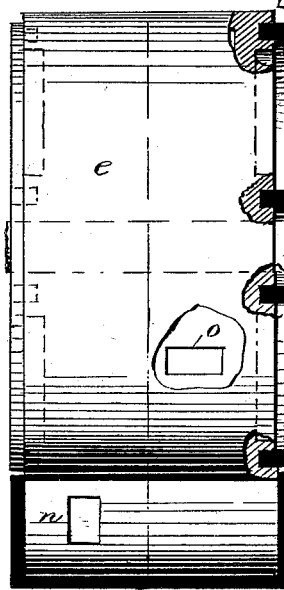
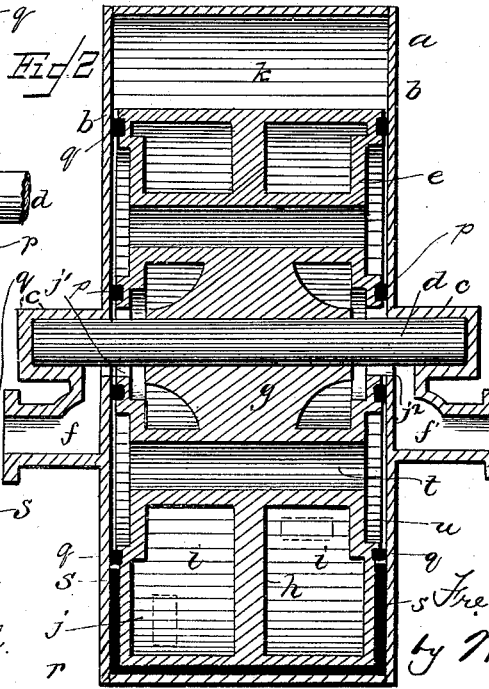
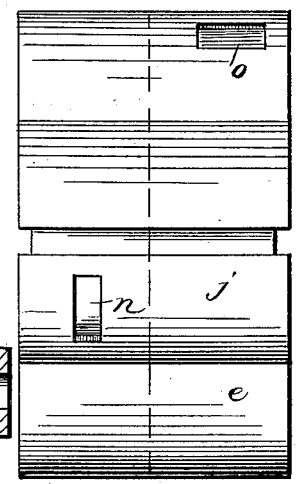
WITNESSES
F. L. Durand
Edwin A. Finckel
INVENTOR
Frederick Stitzel
by Wm H. Finckel
Attorney.

United States Patent Office.

FREDERICK STITZEL, OF LOUISVILLE, KENTUCKY, ASSIGNOR OF ONE-HALF TO ADOLPH REUTLINGER, OF SAME PLACE.

ROTARY WATER-METER.

SPECIFICATION forming part of Letters Patent No. 297,092, dated April 15, 1884.

Application filed July 24, 1883. (Model.)

*To all whom it may concern:*

Be it known that I, FREDERICK STITZEL, a citizen of the United States, residing at Louisville, in the county of Jefferson and State of Kentucky, have invented certain new and useful Improvements in Rotary Water-Meters, of which the following is a full, clear, and exact description.

This invention is in the nature of a pressure liquid-meter; and the object of the invention is to obtain a simple, compact and reliable mechanism for measuring and registering the quantity of liquid—say, water—consumed at a given place, the operation of the mechanism being controlled entirely by the draw-off cocks at the point or place of use or consumption.

The invention consists, as hereinafter specified and claimed, of a cylindrical casing, having tubular bosses, and containing an inlet and an outlet, combined with an inclosed rotary piston, divided centrally into two chambers, provided with ports, and communicating with an annular water-way between the periphery of the piston and the cylinder; a recessed hub for the piston, its shaft boxed in said bosses, and with gravitating valves, the two piston-chambers being separate and independent, whereby the water enters one of the piston-chambers, and is by it discharged into the cylinder's water-way, whence it is taken through the port of the other piston-chamber and discharged into the service-pipe or delivery medium. The capacity of the water-way being known, and it being filled and emptied at each revolution of the piston, it follows that a registering mechanism connected with said piston will register the quantity of liquid passing through said meter.

In the accompanying drawings, illustrating my invention, in the several figures of which like parts are similarly designated, Figure 1 is a side or end elevation of my meter with the near head or cap removed. Fig. 2 is a central vertical cross-section. Fig. 3 is an edge view, partly in section, of the piston removed, and Fig. 4 is a bottom plan view of said piston, with the packing removed from its head to show the grooves therein.

The casing $a$, which I will hereinafter designate a "cylinder," is composed of an annular rim, with heads $b\ b$ bolted thereto water-tight. These heads are provided centrally with tubular closed bosses $c\ c$, which serve as boxes to receive and contain water-tight the shaft $d$ of the piston $e$. Tubes $f\ f'$, opening through the heads $b\ b$ into the cylinder, project from said heads below the shaft-boxes, and one of such tubes—say, $f$—constitutes the inlet, and the other, $f'$, the outlet, tube $f$ being connected, say, with the main, and tube $f'$ with the service-pipe of a water-supply system. The piston $e$ has a recessed hub, $g$, whereby it is fitted tightly to and rotates the shaft $d$; and said piston is divided by a central partition, $h$, into two chambers $i\ i'$, which are entirely separated and non-communicating. It is also provided with a piston-head, $j$. The chamber $i$ is in communication, through the recessed hub and port or inlet $j'$, with the induction-tube $f$; and the chamber $i'$ is in communication with the outlet or discharge tube $f'$, through the other end of the recessed hub, and the port or outlet $j^2$.

Between the piston and the cylinder is an annular water-way, $k$, divided by gravitating valves $l\ l'$, arranged in boxes $m\ m'$ on the casing, and seating on the piston. The chamber $i$ communicates with this water-way through the port $n$ in the piston-head, whereby said water-way is supplied with the liquid to be measured; and the chamber $i'$ is in separate and independent communication with the water-way through the port $o$ on the other side of and just below the piston-head. The piston and piston-head are fitted water-tight in the cylinder by the packings $p\ q\ r\ s$, the packings $p$ and $q$ being rings arranged in grooves on the faces of the piston, and the packings $r$ and $s$ being strips set in grooves in the head $j$ to fit it water-tight in the water-way $k$. The faces of the piston are provided with tubes $t$, extending from one to another transversely of the piston, and with depressions $u$, whereby leakage is compensated for to obtain an equilibrium of pressure. The head of the piston is compensated for as to weight in the casting or making of the piston, so as to obviate a dead-center.

The operation is as follows: Water flows through tube $f$ into the chamber $i$, and thence through port $n$ into the water-way $k$, and filling said way up to the under side of the valve *l* exerts a pressure against the head, which, with the momentum of the inflowing water, will drive the piston to the right, which will effect the rotation of the piston so long as there is a head of water and an exhaust. Port *o*, being the exhaust-port and in advance of the induction-port *n*, discharges the air in the water-way *k* before the valve *l'*, and then passing under the said valve also exhausts there. The moment the port *o* has passed valve *l'* the curvilinear face of the piston-head comes into contact with valve *l'*, raises it, and passes beneath and beyond it, the said valve *l'* being again seated against the piston by gravitation. The raising and passing of valve *l'* was done without pressure on either side thereof, as port *o* had already passed before and behind or beyond it before the piston-head came in contact with it. The port *o* in the continued rotation of the piston now coming near the valve *l*, reaches it, and said valve is similarly raised, and the port *o* passes under and beyond it. The moment the edge of port *o* is beyond valve *l* the pressure is thrown from the lower surface of said valve to the top surface of valve *l'*. The water-way is now completely filled with water, except what is displaced by its contents of mechanism, and remains so as long as there is a water head or supply. As port *o* now exhausts or educts the water it is drawn off by the service-cocks. Port *n* will induct the same quantity as that discharged. The piston, continuing its rotation and port *o* its eduction, said port will pass under and beyond valve *l'*, thereby throwing the pressure on the lower surface of valve *l*. The piston-head then again raises valve *l'* and passes under and beyond it. Port *o* next passes under and beyond the valve *l*, whereby the pressure is thrown from the lower surface of *l* to the top surface of valve *l'*, and so on continuously. The valve *l* holds the pressure until the valve *l'* has been raised and passed by the piston-head, and so, similarly, the valve *l'* holds the pressure until valve *l* has been so operated. These valves work in the boxes *m m'*, as stated, and said boxes may be merely grooves dressed in thickened parts of the heads of the cylinder. The port *o* always empties or exhausts the water-way or cylinder in advance of the raising of the valves by the piston-head, and there is thus absolutely no dead-center or diminished-pressure area in the meter. As the piston will usually only be rotated about twenty-five times a minute, the valves have plenty of time to seat. The head and piston are balanced simply to wear longer, and an unbalanced piston will rotate and measure quite as well.

I have not shown any registering mechanism, as its application to the shaft *d* is obvious. I may, however, say that the register of any approved pattern may be inclosed in a glass-faced extension of one of the boxes *c*, or may be attached thereto, and a connection with the shaft *d* made by a very small needle-like shaft extended water-tight through said box.

In a concurrent application, Serial No. 101,747, I have shown the principles of this invention applied to a rotary steam-engine, and therefore do not herein claim the subject-matter of the invention therein claimed.

What I claim is—

1. In a water-meter, the combination, substantially as shown and described, of a cylinder, an inclosed concentric rotary piston divided into two separate non-communicating chambers, a water-way between the piston and cylinder, a head on such piston fitted water-tight in said water-way, valves in said water-way seated on the piston and operated by the piston-head for opening, and by gravity for closing, a shaft for the piston, tubular water-tight bosses forming boxes for said shaft, the recessed hub of the piston fitted to said shaft, and an inlet and outlet communicating with said chambers through the recessed hub, substantially as and for the purpose described.

2. The piston divided into two non-communicating chambers, provided with ports independent of one another, an inlet and an outlet for each of said chambers, a recessed hub, through which the supply is introduced and the exhaust discharged, a cylinder and tubular bosses in which said piston and its shaft are inclosed water-tight, a water-way between the cylinder and piston, in which the piston-head is rotated water-tight, and with which the piston-chamber ports communicate, and packings for securing the piston water-tight within the cylinder, substantially as set forth.

In testimony whereof I have hereunto set my hand this 21st day of July, A. D. 1883.

FREDERICK STITZEL.

Witnesses:
J. C. DAWES,
GEO. H. IRWIN.